March 15, 1960 G. G. HARMAN, JR 2,928,937

ELECTROLUMINESCENT MICROWAVE RECEIVER

Filed Sept. 8, 1955

INVENTOR

George G. Harman, Jr.

BY Arthur Vinograd

Leonard F. Stoll ATTORNEY

AGENT

United States Patent Office 2,928,937

Patented Mar. 15, 1960

2,928,937

ELECTROLUMINESCENT MICROWAVE RECEIVER

George G. Harman, Jr., Washington, D.C.

Application September 8, 1955, Serial No. 533,264

2 Claims. (Cl. 250—21)

(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952), section 266.

This invention relates to radio wave detectors and particularly contemplates a novel detector suitable for wide-band reception especially at microwave frequencies.

The conventional microwave superheterodyne receiver of the type employing a local oscillator, one or more intermediate frequency amplifier stages and a demodulating means is relatively complex and expensive. Furthermore difficulty arises in locking the frequency of the local oscillator to that of the magnetron or other oscillator employed under the wide temperature and vibrational conditions experienced in many radar installations. Moreover component failures in any one or more of the stages in a superheterodyne receiver may result in complete disablement of the receiver.

The present invention comprises a sensitive microwave receiver that is particularly useful for the broad-band detection of short radar-type pulses or modulation imposed on continuous microwave radiation in a manner which obviates the need for heterodyning techniques. The receiver consists of one or more luminescing crystals such as pure silicon carbide or other suitable electroluminescent material capable of electroluminescing upon excitation by microwave current and voltage. The crystal is mounted in a waveguide, resonant cavity, coaxial line or other suitable energy guide, so that the received waves may be properly matched to the impedance of the crystal. The crystal in turn is biased with direct current to about the threshold of luminescence. The subsequent variations in light emitted from the crystal when subjected to the radio waves are focused on a photomultiplier or other sensitive light detector and a varying amplified output signal is thereby obtained corresponding to the demodulated R.-F. signal.

An immediate object of this invention therefore is to provide a radio detection apparatus which is extremely simple and reliable.

Another object of this invention is to provide a radio wave detector employing an electroluminescent crystal demodulating means.

An additional object of this invention is to provide a radio detector which obviates the need for critical frequency-stable components which characterizes conventional heterodyne type receivers.

Still another object of this invention is to provide an apparatus for the direct conversion of microwave and other high-frequency current and voltage into visible light energy.

Other objects and advantages of the invention will become apparent upon reference to the specification and drawings, in which Fig. 1 is an isometric view showing the arrangement of the principal elements of the detector in accordance with the present invention;

Figures 1, 2, 3, 4:
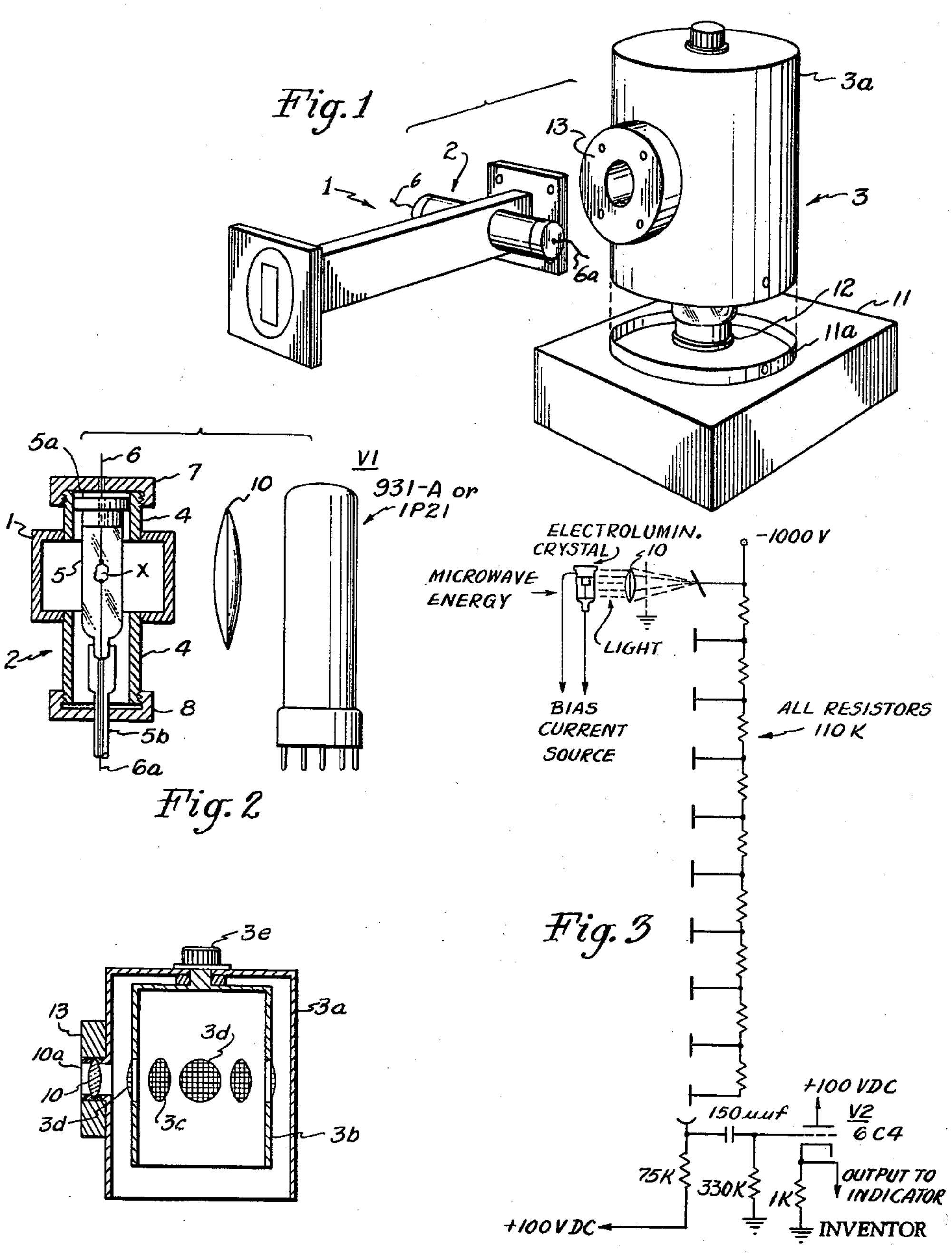
Fig. 2 is a diagrammatic view, partly in section showing the details of the crystal mount and its relation with the photomultiplier.
Fig. 3 is a schematic showing the operative elements of the detector together with a circuit diagram of the photomultiplier.
Fig. 4 is a sectional view of the photomultiplier housing.

The detector according to this invention consists primarily of a waveguide assembly 1 provided with a properly matched crystal mount 2, and a photomultiplier assembly 3. Referring to Fig. 2, the crystal mount 2 lies transversely with respect to the wave guide 1 and comprises a sleeve 4 which extends laterally from the waveguide on opposite sides. The crystal designated as X is embedded in a light transparent plastic 5, such as Lucite which may be applied in the form of either a mold or housing. Leads 6, *6a* for biasing and providing microwave electric field concentration are joined to the crystal in a known manner and are threaded longitudinally through the plastic housing to the exterior of the enclosure. The described method of mounting the crystal is exemplary, it being understood that other conventional mounts such as a cat whisker arrangement can also be employed. In the embodiment illustrating Fig. 2, one end of the plastic housing 5 is joined to a metallic pedestal *5a* while the other end is shaped for frictional engagement with a grommet *5b*. Suitable caps 7, 8 are threaded on the ends of the sleeve, each cap being provided with an opening registering with similar openings in the pedestal and grommet through which the conductors 6, *6a* pass. Fig. 2 symbolically shows the relationship among the crystal X, optical system 10, and photocell V1.

The photocell V1 is mounted on a chassis 11, as shown in Fig. 1, by means of a conventional socket 12. The photocell is mounted within a housing *3a* which provides a convenient means for supporting the waveguide and crystal assembly 1 as well as the optical system to be described. The chassis 11 includes a mounting flange *11a* which serves to secure the housing *3a* to the chassis as is apparent in Fig. 1.

As is more clearly shown in Fig. 4, the lens 10 is carried in a lens mount *10a* provided in a boss 13 secured to the housing *3a*. The interior of the housing is provided with a rotatable turret *3b* which includes a plurality of light-ports *3c* adapted to register with the lens 10. Each of the openings is provided with a screen *3d* to provide maximum energy transfers in a known manner. The turret *3b* is supported from the top surface of the housing *3a* as shown and may be selectively indexed by means of the knob *3c*. The light emitted from the crystal consequent to energization by the applied radio frequency is focused by lens 10 onto the photomultiplier tube V1. The tube V1 forms part of a conventional photomultiplier circuit which is detailed in Fig. 3. Such circuit occupies the interior of the chassis 11. The circuit is conventional and the component values and bias supplies are fully detailed in Fig. 3. The output is obtained across the cathode of a 6C4 tube V2 and may be applied to an oscilloscope or other conventional indicator.

The electroluminescent properties of substances such as silicon carbide crystals have been previously investigated. See, for example, the article by Lehovec, Accardo and Jamgochian entitled "Injected Light Emission of Silicon Carbide Crystals," Physical Review, vol. 83, No. 3, August 1951, pages 603–607. The observed light emissivity of silcon carbide crystals when subjected to temperature and current effects are discussed in such article and it is suggested that such luminescent effect results from the direct recombination of carriers injected across a semiconductor type barrier layer by a voltage applied in a forward direction.

In accordance with the principles of the present invention, the voltage response of an electroluminescent semiconductor such as a silicon carbide crystal is obtained as the result of the application thereto of radio frequency voltage and current, particularly in the microwave spectrum.

In general it has been determined that either an impurity or intrinsic type semiconductor which has been excited by microwave voltage and current emits radiant energy at a wavelength which is a function of the energy gap of the semiconductor. It has been further determined that the light emissivity of the crystal is considerably enhanced when the crystal is initially biased by a direct current source to its threshold of luminescence.

In selecting a crystal which will exhibit light emissivity characteristics suitable for use in connection with the present invention, it is necessary to select those which are optically transparent to the wavelength of the emitted electroluminescent radiation. Carefully selected silicon carbide crystals which have been graded and screened according to optical transparencies are therefore employed. Other semiconductors such as silicon, germanium, gallium phosphide, calcium silicide, aluminum antimide etc. are also applicable. In general properly "doped" semiconductor compounds having an energy gap of about 1 volt or higher appear suitable for use in connection with the principles of this invention.

In operation, the crystal X is biased with D.-C. applied to the conductors 6, *6a* until a faint electroluminescent signal is picked up by the photomultiplier. The waveguide 1 is selected to pass the desired energy spectrum on to the crystal. The resulting variations in light intensities emitted by the crystal are applied through the optical system comprising the lens 10 and screened lightport 3*c* to the photomultiplier VI. The output is connected to a suitable oscilloscope or other convenient indicator. In a typical example, it was determined by means of an oscilloscope that the receiver detected ½ $\mu$s. pulses at a 3-centimeter wavelength. The rise time of the output was about ⅓ $\mu$s. and the decay time about 1 $\mu$s., conditions which are quite suited for radar work. It is to be noted that a portion of such delay time is due to the characteristics of the photomultiplier detector circuit employed and not to any inherent limitation of the crystal.

It is important to recognize that the disclosed system is capable of detecting radiant energy which is substantially below the crystal ionization value; i.e., considerably less than 1 electron volt per photon. The radiant energy must be separated into its voltage and current components rather than appear to the crystal as a photon. This conversion is accomplished by using a waveguide, coaxial line, cavity or other equipment. The device is therefore a voltage or current activated detector suitable for demodulating radio frequency energy.

It will be apparent that the embodiments shown are only exemplary and that various modifications can be made in construction and arrangement within the scope of the invention as defined in the appended claims.

What is claimed is:

1. A voltage-responsive radiant energy detector comprising a waveguide, an electroluminescent crystal which is optically transparent to its emitted radiation mounted in said waveguide, an optically transparent mounting means for holding said crystal within said waveguide, said mounting means including electrical conductors for applying a bias voltage and concentrating the electric fields to said crystal, a light-responsive electric transducer coupled to said waveguide adjacent the crystal, and means for directing the light emitted from said crystal to said transducer.

2. The invention of claim 1 in which said crystal comprises optically transparent silicon carbide.

References Cited in the file of this patent

UNITED STATES PATENTS

| | | |
|---|---|---|
| 706,743 | Fessenden | Aug. 12, 1902 |
| 2,228,064 | Runge et al. | Jan. 7, 1941 |
| 2,496,879 | Lafferty | Feb. 7, 1950 |
| 2,650,311 | Bray et al. | Aug. 25, 1953 |
| 2,681,416 | Thompson | June 15, 1954 |
| 2,711,530 | Rines | June 21, 1955 |
| 2,756,343 | Johnson | July 24, 1956 |